(12) United States Patent
Molloy et al.

(10) Patent No.: US 9,412,140 B2
(45) Date of Patent: Aug. 9, 2016

(54) METHOD AND SYSTEM FOR INSPECTION OF TRAVELERS

(75) Inventors: Kevin Molloy, Richmond (CA); Paul Mewett, Richmond (CA)

(73) Assignee: VANCOUVER AIRPORT AUTHORITY, Richmond (CA)

( * ) Notice: Subject to any disclaimer, the term of this patent is extended or adjusted under 35 U.S.C. 154(b) by 210 days.

(21) Appl. No.: 12/234,467

(22) Filed: Sep. 19, 2008

(65) Prior Publication Data

US 2010/0051679 A1 Mar. 4, 2010

(30) Foreign Application Priority Data

Aug. 26, 2008 (CA) ..................................... 2639144

(51) Int. Cl.
| | |
|---|---|
| *G06Q 10/00* | (2012.01) |
| *G06Q 50/26* | (2012.01) |
| *G06Q 10/10* | (2012.01) |
| *G07F 17/42* | (2006.01) |
| *G06Q 10/02* | (2012.01) |
| *G07C 9/00* | (2006.01) |
| *G07B 15/00* | (2011.01) |

(52) U.S. Cl.
CPC ................. *G06Q 50/26* (2013.01); *G06Q 10/10* (2013.01); *G06Q 10/02* (2013.01); *G07B 15/00* (2013.01); *G07C 9/00071* (2013.01); *G07C 9/00087* (2013.01); *G07C 2209/41* (2013.01); *G07F 17/42* (2013.01)

(58) Field of Classification Search
CPC .............................. G06Q 10/02; G06Q 50/26
USPC .................................................... 235/375, 382
See application file for complete search history.

(56) References Cited

U.S. PATENT DOCUMENTS

| | | | | |
|---|---|---|---|---|
| 5,572,008 | A * | 11/1996 | Sakai ................. | G06K 7/10702 235/462.4 |
| 5,770,848 | A * | 6/1998 | Oizumi .............. | G06K 7/10831 235/383 |

(Continued)

FOREIGN PATENT DOCUMENTS

| | | |
|---|---|---|
| WO | 03/052741 A1 | 6/2003 |
| WO | 2008/097335 A2 | 8/2008 |

OTHER PUBLICATIONS

International Search Report of PCT/CA2009/001171 dated Dec. 3, 2009.

(Continued)

*Primary Examiner* — Christopher Stanford

(57) ABSTRACT

A kiosk for processing arriving travelers is provided, wherein the kiosk reads information from the traveler's travel document, and either receives a completed declaration form from the traveler or poses a series of questions to the traveler. On obtaining the needed information from the traveler, the kiosk queries a government computer to obtain a code for the traveler. The code, when shown to a government official, such as a customs agent, will determine if the traveler is retained for secondary processing.

50 Claims, 11 Drawing Sheets

(56) References Cited

U.S. PATENT DOCUMENTS

| | | | |
|---|---|---|---|
| 6,085,976 | A | 7/2000 | Sehr |
| 6,588,669 | B1* | 7/2003 | Claus ................ G06K 7/10613 235/383 |
| 6,786,401 | B2* | 9/2004 | Kimoto et al. ................ 235/382 |
| 2002/0100803 | A1 | 8/2002 | Sehr |
| 2002/0169692 | A1 | 11/2002 | Dutta et al. |
| 2002/0198731 | A1 | 12/2002 | Barnes et al. |
| 2004/0078335 | A1* | 4/2004 | Calvesio et al. ................ 705/50 |
| 2004/0172364 | A1 | 9/2004 | Murray et al. |
| 2005/0167484 | A1 | 8/2005 | Sussman |
| 2005/0251404 | A1* | 11/2005 | Pento et al. ................ 705/1 |
| 2007/0158418 | A1 | 7/2007 | Weekes |
| 2008/0018451 | A1 | 1/2008 | Slibeck et al. |
| 2013/0200157 | A1* | 8/2013 | Nunnink ................ G06K 7/1491 235/462.22 |

OTHER PUBLICATIONS

Written Opinion of the International Searching Authority dated Dec. 3, 2009.

"Automated Arrival Clearance for Frequent Visitors", May 22, 2015, XP002739070, retrieved from the Internet: URL: http://www.fragomen.com/newsresources/xprNewsDetailFrag.aspx?xpST=GlobalAlerts&New=274 [retrieved on Apr. 28, 2015].

Extended European Search Report dated Jul. 3, 2015 issued in respect of European Patent Application No. 09809141.6.

* cited by examiner

Declaration Card

| -For Agency Use- | | | | |
|---|---|---|---|---|
| Resident | U.S. Visitor | Other Visitor | Crew | Other |

Part A | All Travelers  Please print in all capital letters.

1. Last name, first name, initials:

Date of Birth:                   Citizenship:

2. Last name, first name, initials:

Date of Birth:                   Citizenship:

Number of family members under 16 years of age travelling with you: ▶

Home address - Number, street:          Town/city:
Prov. or state:      Country:           Postal/zip code:

Arriving by:                        | Purpose of trip: | Arriving from:
Air    Rail    Marine    Highway    | Study    Business | U.S. only    Other country direct
Airline/flight No., train No., or vessel name | Personal | Other country via U.S.

Please note that failure to properly declare goods that you or your family members are bringin into Canada may result in seizure of the goods, monetary penalties and/or criminal prosecution.

I am (We are) bringing into Canada:
- Firearms or other weapons (e.g., switchblades, mace or pepper-spray).
- Commercial goods, whether or not for resale (e.g., samples, tools, equipment).
- Meal or meat products; cream, milk, cheese or other dairy products; fruits; vegetables; seeds; nuts; plants; plant parts; cut flowers; soil; wood products; birds; animals, animals parts or insects.
- Currency or monetary instruments totalling CAN $10,000 or more.

I/We have shipped goods that are not accompanying me.
I/We have visited a farm and will be going to a farm in Canada.

Part B | Visitors to Canada

Duration of stay in Canada:     ○ Do you or any family members exceed the duty-free
         days                        I/We have visited a farm and will be going to a farm in Canada.
- Gifts valued at no more than CAN$60 each (excludes alcohol and tobacco).
- 1.5 L of wine or 1.14 L of liquor or 24 x 355 mi cans or bottles (maximum of 8.5L) of beer or ale.
- 200 cirgarettes, 200 tobacco sticks, 50 cigars or cigarillos and 200 grams of manufactured tobacco.

Part C | Residents of Canada

Date left Canada:          ○ Good purchased and/or received     CANS
                              abroad of a total value of:
[1]                        ○ Do you or any family members exceed the personal   Yes   No
[2]                           exemptions below: (per person)?

Resident exemptions-minimum absence from Canada-if eligible, please check one:
24 hours:  CAN$50  ▷ Excludes alcohol and tobacco, and it does not apply if goods exceed $50.
48 hours:  CAN$400 ▷ Includes 1.5 L of wine or 1.14 L of liquor or 24 x 355 mi cans or bottles (maximum of 8.5L) of beer or ale.
7 days:    CAN$750   Includes 200 cirgarettes, 200 tobacco sticks, 50 cigars or cigarillos and 200 grams of

Signature:(age 16 & older) I certify that this declaration is true, accurate, complete

[1]
[2]

E311 (07/07) Draft #31C        FIG. 6        BSF311        Canada

METHOD AND SYSTEM FOR INSPECTION OF TRAVELERS

CROSS REFERENCE TO RELATED APPLICATIONS OR PRIORITY CLAIM

This application claims priority to Canadian Patent Application No. 2,639,144 filed Aug. 26, 2008.

FIELD OF THE INVENTION

The invention relates to the processing of travelers, and more particularly, to the processing of travelers arriving into a jurisdiction from another jurisdiction.

BACKGROUND OF THE INVENTION

The typical processing of travelers arriving at an airport in North America from another country is slow and labour intensive, and can lead to long waits and frustrated travelers. The typical process involves having the incoming traveler, or at least one representative traveler per family group, complete a general declaration form for customs and immigration purposes. The completed declaration form will have information about the name and address of the traveler(s), when they left the jurisdiction which they are entering, or if they are not residents of such jurisdiction, how long they will be staying. Other questions on the declaration form are often about the goods being brought into the jurisdiction, such as the value of the goods, and questions about the type of goods (for example agriculture materials, cash, weapons, etc.). The form usually also requires, at a minimum, a signature of the completing traveler.

Once arriving in the jurisdiction, the completed declaration form and passport are manually inspected by a government official, such as a customs or immigration officer. This official marks a code on the form, for use by a second government official controlling the exit point. The traveler waits in a line until they are interviewed by the second official, who determines if the traveler can pass through, or is sent for secondary customs processing.

The entry process is labour intensive, as each traveler must deal with up to two government officials, and this often results in long wait times to reach one or both of the government officials, particularly when, for example, several international flights must be processed at the same time.

One attempt to resolve this problem is with programs that allow frequent cross-border passengers a means of avoiding the long wait times by participating in a pre-screening registered traveler process. An example of such a program is NEXUS, a registered traveler program for self service border clearance into Canada and the United States. The NEXUS program is available to Canadian and United States citizens, and requires payment of an enrolment fee. There are now over 10,000 NEXUS members, who have participated in over 55,000 border transactions. Membership in NEXUS allows travelers to bypass the customs line-ups; however, the number of members is too low to have a significant impact on border line-ups. Further, the additional cost of such registrations creates two classes of passengers, those who have gone through the trouble and expense of pre-registering, and those who have not.

Another attempt to resolve these problems is found in U.S. Pat. No. 6,085,976, which discloses a multi-application passenger card. The card is able to store information including aircraft ticketing and passport information and is readable at various passenger stations that are located in airports and/or on aircraft. In one application, immigration/custom forms are filled out using the card by displaying the form on a card-based template. The form may be stored in the card, via another mobile terminal, or may be downloaded from the airline's database or scanned from a hardcopy. The form is automatically populated where information on the card already exists and allows for passenger input where required. Upon completion, the form is signed via an electronic signature pad. A customs agent subsequently accesses the card to review the passport and immigration/customs form.

U.S. Patent Application No. 2002/0198731 discloses an apparatus and method for expediting the customs and immigration process. A passenger electronically fills out a customs declaration form in the out-bound country and the information is passed to the government in the in-bound country. After each passenger's identity is confirmed, instructions are outputted to a computer interface at the in-bound country's customs and immigration. In one embodiment, a printer prints a ticket with the instructions. A difficulty with this solution is that it requires both the out-bound and in-bound countries to cooperate, share information data sources and use the same, or at least similar, technology.

Other relevant art includes U.S. Patent Application Nos. 2002/0169692, 2004/0078335, 2004/0172364 and 2007/0158418.

SUMMARY OF THE INVENTION

The system and method according to the invention includes an electronic kiosk for processing incoming travelers having machine readable travel documents. The kiosk is accessed following arrival into the jurisdiction, for example by deplaning, and prior to inspection by a customs agent. Travelers scan their travel documents at the kiosk and allow their completed declaration form to be read at the kiosk (or alternatively answer a series of questions posed by the kiosk). The kiosk uses this information from the traveler to obtain data about the traveler from a government agency, such as customs and/or immigration agency. Each traveler (or family group) receives a referral code in the form of a bar code on a receipt from the electronic kiosk upon completion of the pre-inspection process. If the declaration form is read by the kiosk, the code may be printed directly onto the declaration form, in lieu of a separate receipt. The code (unknown to the traveler) indicates a "release" or a "refer" code thereon to indicate whether the traveler should be permitted to exit the customs and immigration area upon claiming baggage or be detained for secondary inspection.

The benefits of the system and method according to the invention include improved border protections, improved customer service, more effective and efficient use of government resources, increased facility capacity, and future portability and adaptability.

A kiosk for processing a traveler is provided, including means for receiving and reading information from a travel document associated with the traveler; means for providing questions to the traveler, the questions including a question relating to residence of the traveler; communication means for transmitting the information from the passport and the answers to the questions to a government computer; communications means for receiving a code from the government computer; and a printer for preparing a receipt for the traveler, the receipt including the code received from the government computer.

A system for processing travelers into a jurisdiction is provided, including: a kiosk having means for receiving and reading information from a travel document associated with the traveler; means for providing questions to the traveler, including a question relating to residence of the traveler; communication means for transmitting the information from the passport and the answers to the questions to a government computer; communications means for receiving a code from the government computer indicating if the traveler requires secondary processing; and a printer for preparing a receipt for the traveler including the code received from the government computer; and an area between said arrival area of the traveler and an exit area, where the kiosk is located; and a processing area wherein the traveler is directed to, if the traveler receives a code indicating the traveler requires secondary processing.

A kiosk for processing a traveler is provided, including: means for receiving and reading information from a travel document associated with the traveler; means for receiving and reading information from a declaration form from the traveler; communication means for transmitting the information from the travel document and from the declaration form to a government computer; communications means for receiving a code from the government computer; and a printer. If the declaration form cannot be read by the kiosk, the traveler may be prompted to provide information to the kiosk. The code may be printed by the printer for receipt by the traveler, or the code may be printed by the printer on the declaration form.

A system for processing travelers into a jurisdiction is provided, including (a) a kiosk having means for receiving and reading information from a travel document associated with the traveler; means for receiving and reading information from a declaration form from the traveler; communication means for transmitting the information from the travel document and from the declaration form to a government computer; communications means for receiving a code from the government computer indicating if the traveler requires secondary processing; and a printer; (b) an area between the arrival area of the traveler and an exit area, where the kiosk is located; and (c) a processing area wherein the traveler is directed to, if the traveler receives a code indicating the traveler requires secondary processing.

A method for processing a traveler is provided, including the steps of: (a) providing a kiosk to the traveler, the kiosk providing a plurality of questions to the traveler; (b) the kiosk receiving a travel document from said traveler; (c) the kiosk transmitting information about the traveler to a government computer; (d) the kiosk receiving a code from the government computer; and (e) printing a receipt for the traveler, the receipt containing the code. The kiosk may generate a second code based on answers to the questions, the second code printed on the receipt.

A method for processing a traveler is provided, including the steps of: (a) providing the traveler a declaration form, the declaration form including a plurality of questions answerable by the passenger; (b) providing a kiosk to the traveler, the kiosk receiving the declaration card from the traveler; (c) the kiosk receiving a travel document from the traveler; (d) the kiosk transmitting information about the traveler to a government computer; (e) the kiosk receiving a code from the government computer; and (e) printing the code on the declaration form.

DESCRIPTION OF THE FIGURES

FIG. 6 is a depiction of a declaration form; and

DETAILED DESCRIPTION

In this document, the following terms will have the following meanings:

"traveler" means a person arriving into a jurisdiction from a second jurisdiction. A traveler may be alone or may represent a family "group" of travelers. In the embodiments disclosed in this document, the travelers will be represented as airline passengers, although travelers may enter a jurisdiction through other means, such as train, bus, boat, or the like;

"customs" means the government agency responsible for controlling entrance by persons and goods into a jurisdiction, and is often responsible for both customs and immigration;

"declaration form" means a form for completion by a traveler with information about the traveler related to customs and immigration, for example the declaration of goods being brought into the jurisdiction by the traveler, and the nationality and citizenship of the traveler. A single traveler may complete a declaration form for more than one traveler (e.g. a family group). Such forms may be referred to as general declarations, customs declaration forms or cards, declaration cards, or customs forms or cards, depending on the particular jurisdiction;

"jurisdiction" means a legal territory with borders monitored by a customs and/or immigration agency. A jurisdiction is typically, but not necessarily, a country;

"travel document" means a machine readable government certified travel document issued to a traveler, such as a passport, resident card, citizenship card, or other secure identification card, and which may be required to enter a jurisdiction;

"government computer" means a conventional computer, or a network of computers containing a database of travelers and passport holders, and information about potential travelers. The government computer may be operated by a customs and/or immigration agency; and "kiosk" means a self-service computer that allows travelers entering a jurisdiction to enter information or documents. The kiosks may be networked using a conventional server, or each may be independently in communication with a government computer.

The system according to the invention provides for an efficient means of processing travelers entering a jurisdiction. Travelers entering the jurisdiction are led to a plurality of kiosks, at which they select a kiosk to provide information about themselves, and have their travel documents scanned. After this process, they are issued a code by a government computer, which is then shown to a government officer. The government officer either directs the traveler to secondary processing by customs and/or immigration, or allows the traveler entry to the jurisdiction.

The system and method according to the invention will be described herein in relation to an airport, and travelers who are arriving in the jurisdiction via an airplane, however, the system and method may be used with other forms of transport, including sea (e.g. by boat), or land (e.g. by train or bus).

Figure 1:
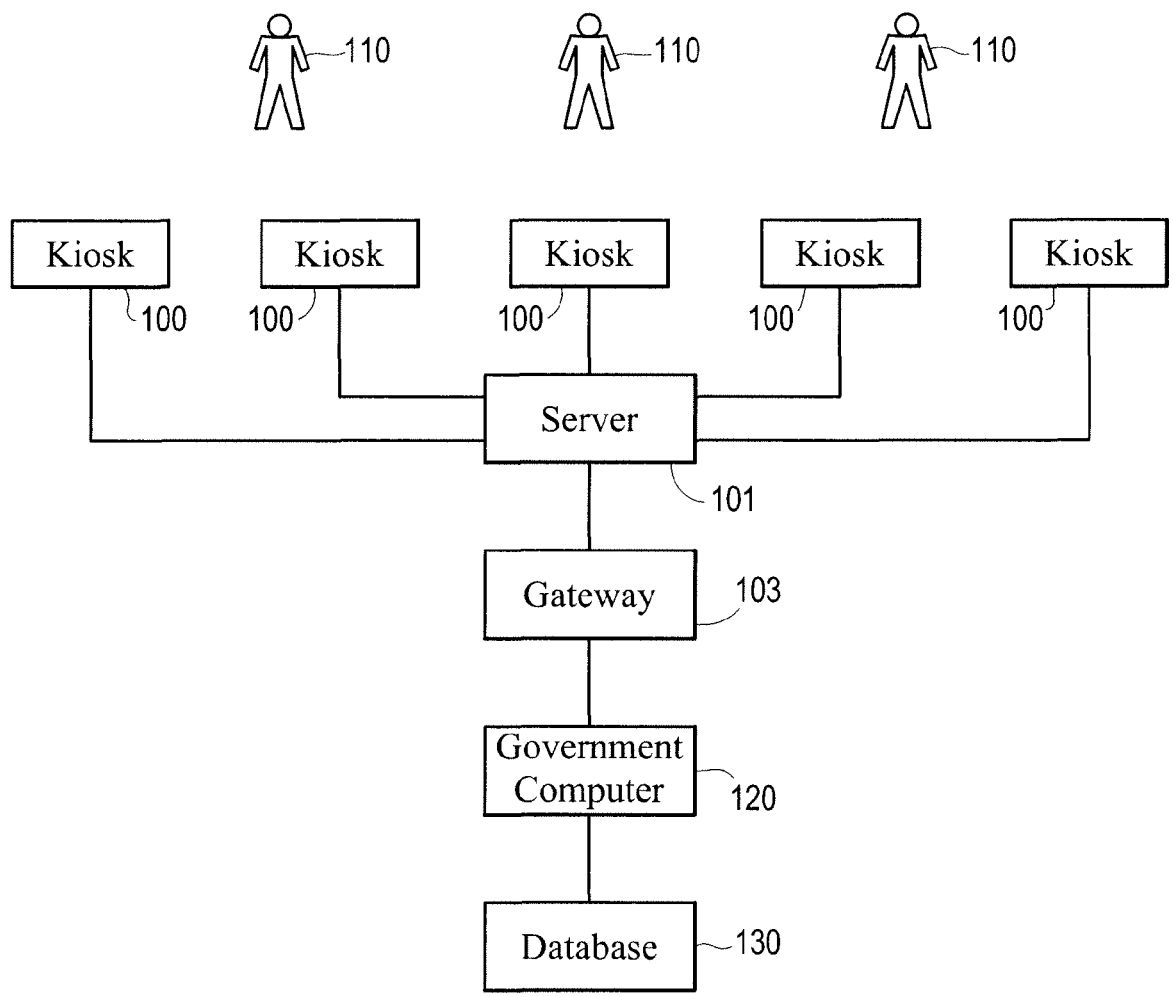
FIG. 1 is a block diagram showing the system according to the invention.

As seen in FIG. 1, kiosks 100, accessible by travelers 110, are in communication with government computer 120, preferably over a secure communications network. Government computer 120 may be a conventional server or servers, and has access to a customs and/or immigration database 130 containing information about travelers and travel document holders. Kiosks 100 may be in a network, wherein each kiosk 100 is in communication with server 101. Server 101 is then in communication with interface 103, which acts as a gateway between server 101 and government computer 120.

Figure 2:
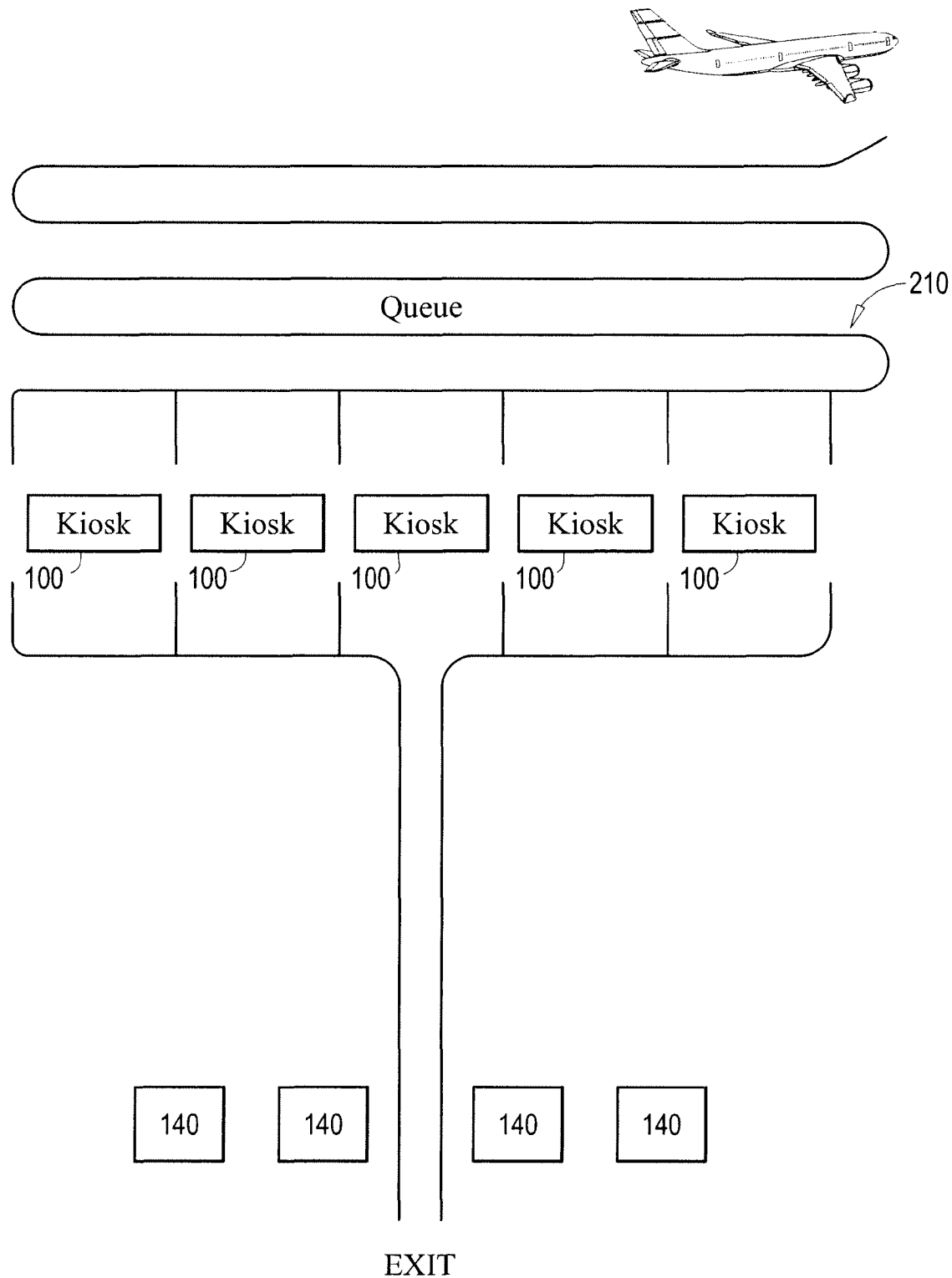
FIG. 2 is a block diagram showing an overview of a layout of an airport according to the invention.

As seen in FIG. 2, the kiosks 100 may be positioned between the entry point 210 of travelers 110, and customs and/or immigration area 140, wherein travelers 110 are interviewed by a government agent, such as a customs agent, before being permitted to exit. The travelers are led to entry point 210 from their debarkation point (e.g. airline gate) via signs or the like.

Figure 3:
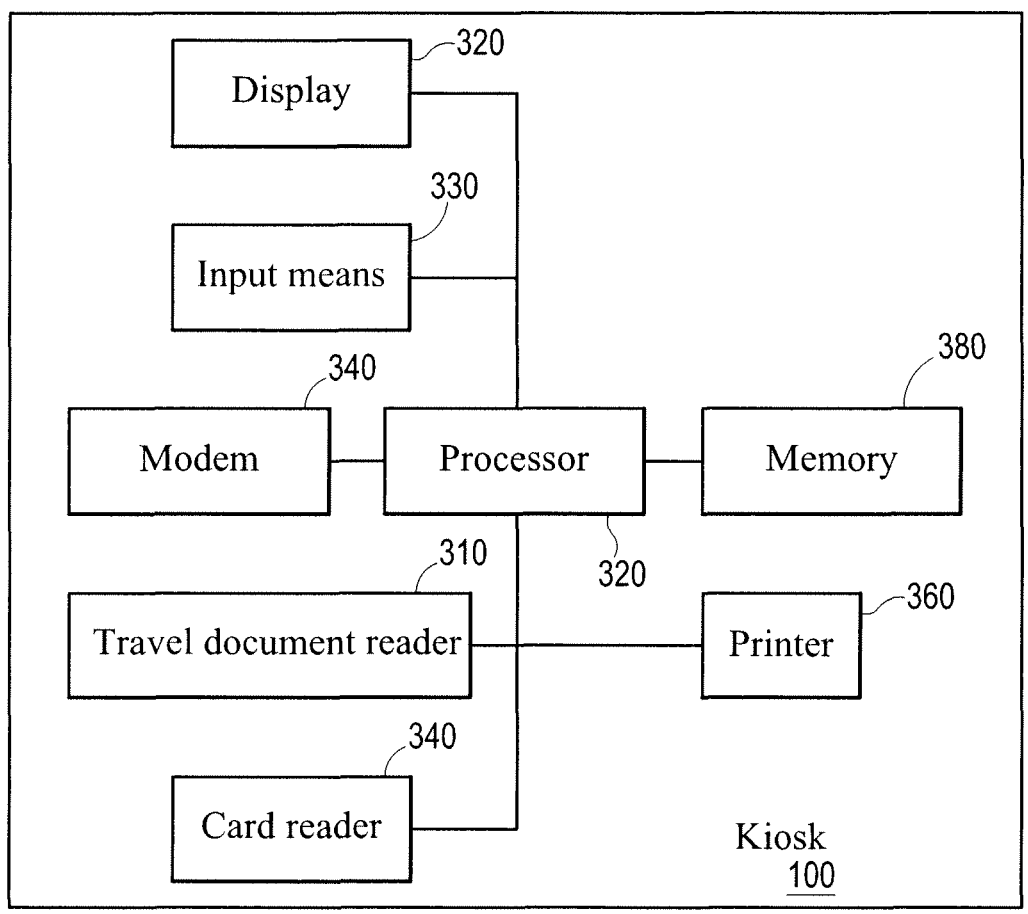
FIG. 3 is a block diagram of a kiosk according to the invention.

As seen in FIG. 3, kiosks 100 include a travel document reader 310, a display 320, and input means 330. Travel document reader 310 is conventional and can scan passports, or other travel documents, using the machine readable portion thereof. Display 320 is positioned for viewing by travelers 110. Input means 330 may be a mouse, keyboard, or keypad, but is preferably a touch screen incorporated into display 320.

Kiosks 100 also include a modem 340 for communications with government computer 120. In an embodiment of the invention, kiosks 100 may include a card reader 340 for reading customs forms 350. Kiosks 100 also include printer 360 for printing a receipt or marking customs form 350. Kiosks 100 also include conventional computer components, such as processor 370 and memory 380.

Kiosks 100 may include a number of other features. For example, kiosks 100 may include a biometric scanner to identify the traveler, or confirm that the traveler is the individual who properly owns the travel document being used. If the travel document includes biometric information, this identification can be accomplished using a retinal scan or fingerprint, so therefore kiosk 100 could include a device for conducting retinal scans or obtaining fingerprints. Also kiosk 100 could include a camera to photograph the traveler and compare the photograph to the photo in the travel document.

As a further security feature, kiosk 100 could include a signature analyzer to compare the scanned signature on the customs form (if it is scanned by the kiosk 100) with the signature on the travel document.

In an alternative embodiment, kiosks 100 could be placed in the jurisdiction from which travelers are departing. In this embodiment, the communications between server 101 and government computer 120 must cross the jurisdictional boundaries. A key advantage to this embodiment is that if travelers are not permitted entry into a jurisdiction to which they are attempting to travel to, they will not be permitted to leave the departing jurisdiction, thereby avoiding the inconvenience and expense of a later deportation. Such an embodiment does require close cooperation between jurisdictions.

Entry Process for Travelers

Figure 4:
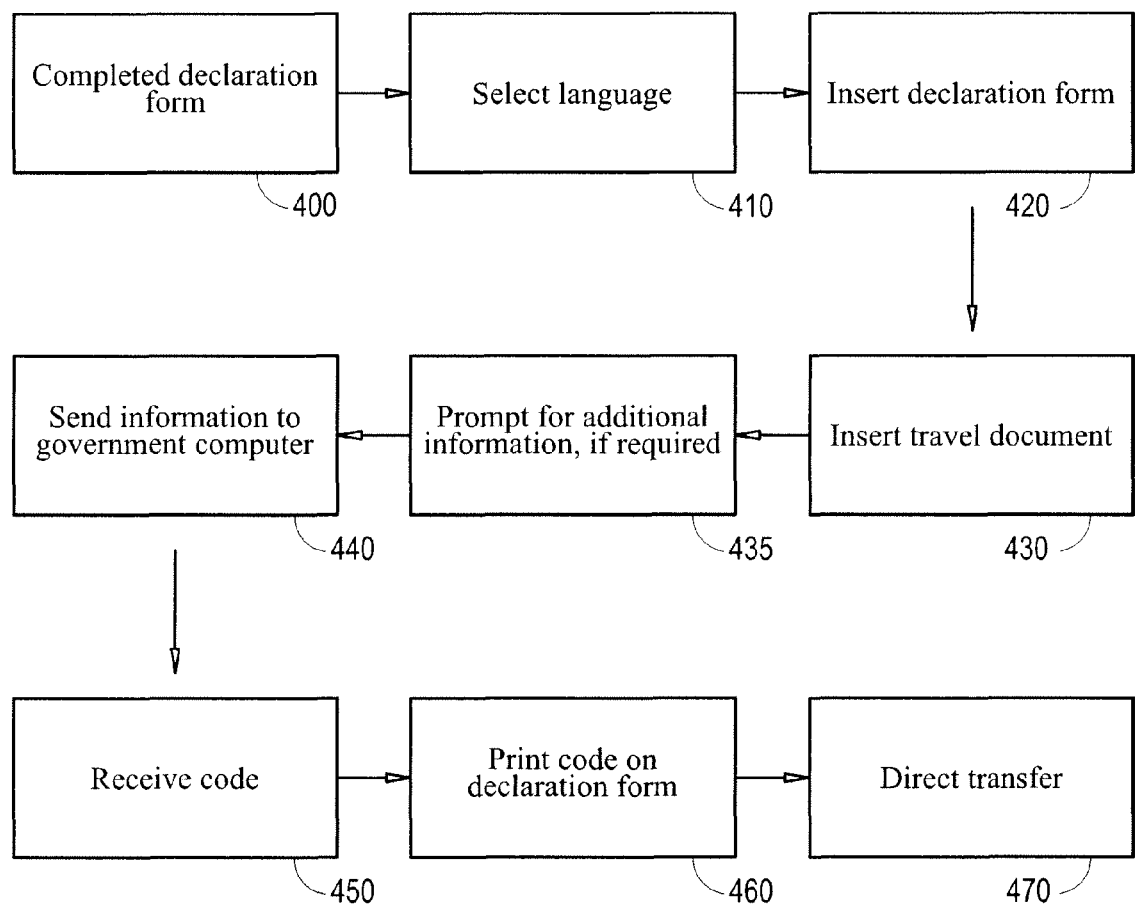
FIG. 4 is a flow chart showing the process by which travelers are processed according to the invention.
Figure 5:
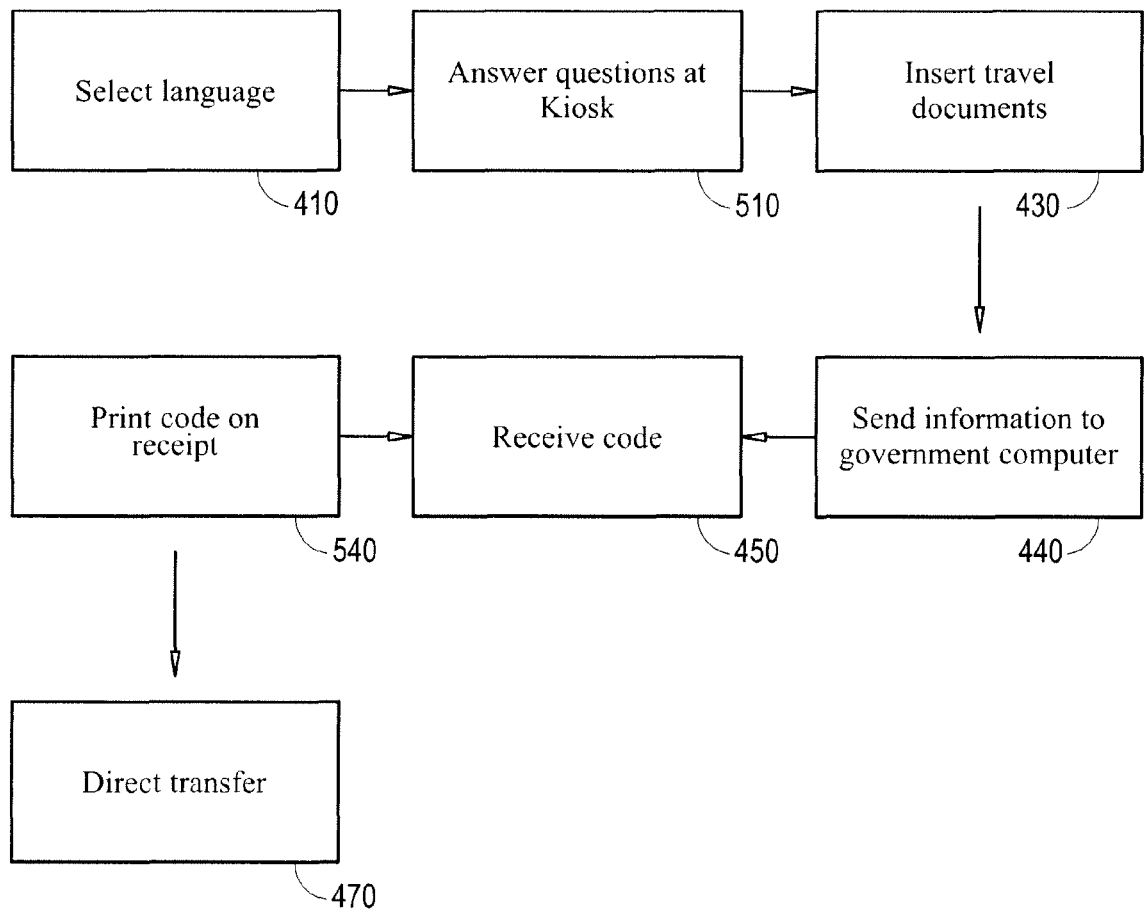
FIG. 5 is a flow chart showing an alternative embodiment of a process by which passengers are processed according to the invention.
Figure 7A:
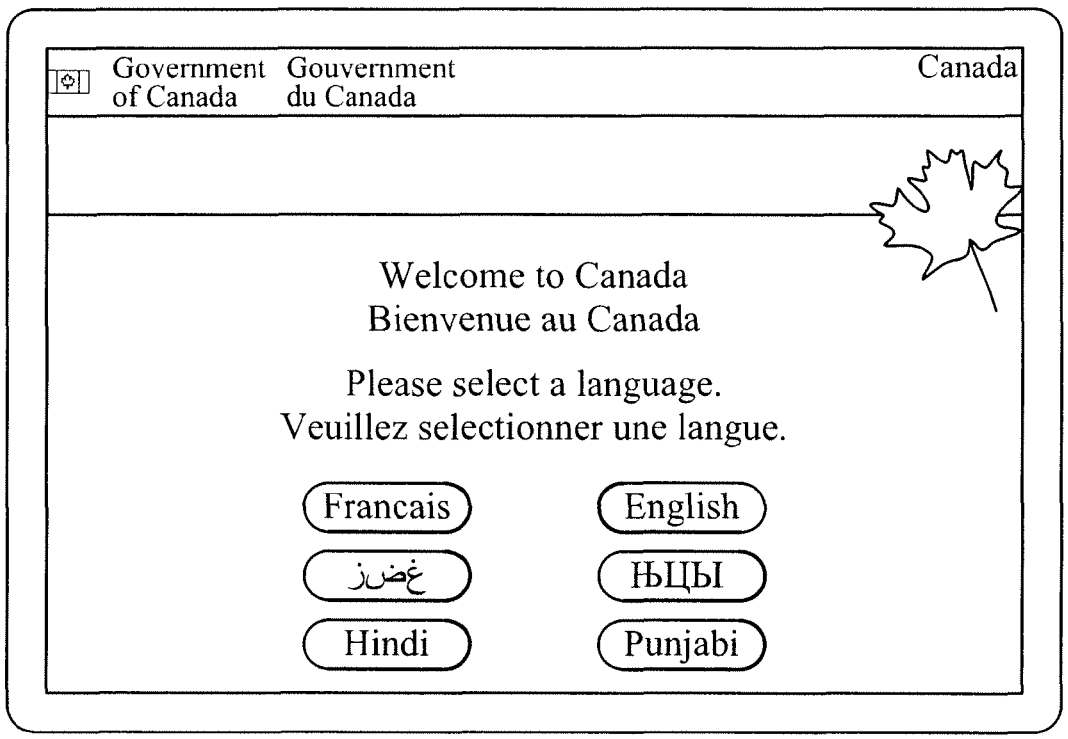
FIGS. 7A to 7J are representations of display screens for travelers according to the invention.
Figure 7B:
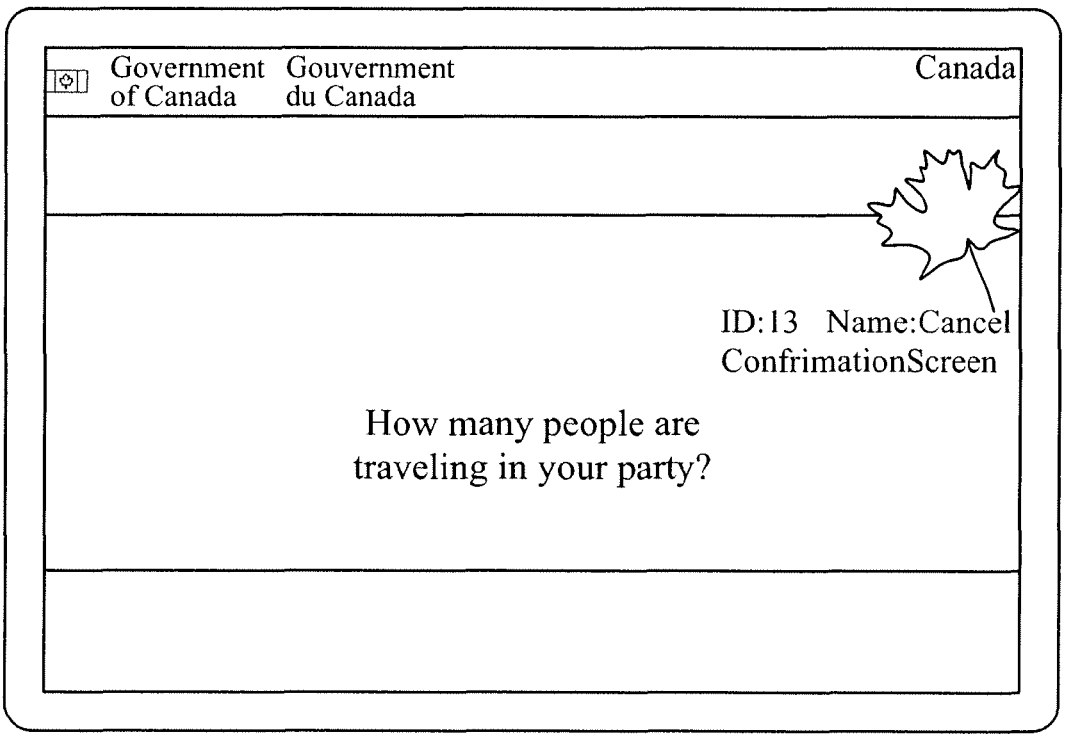
Figure 7C:
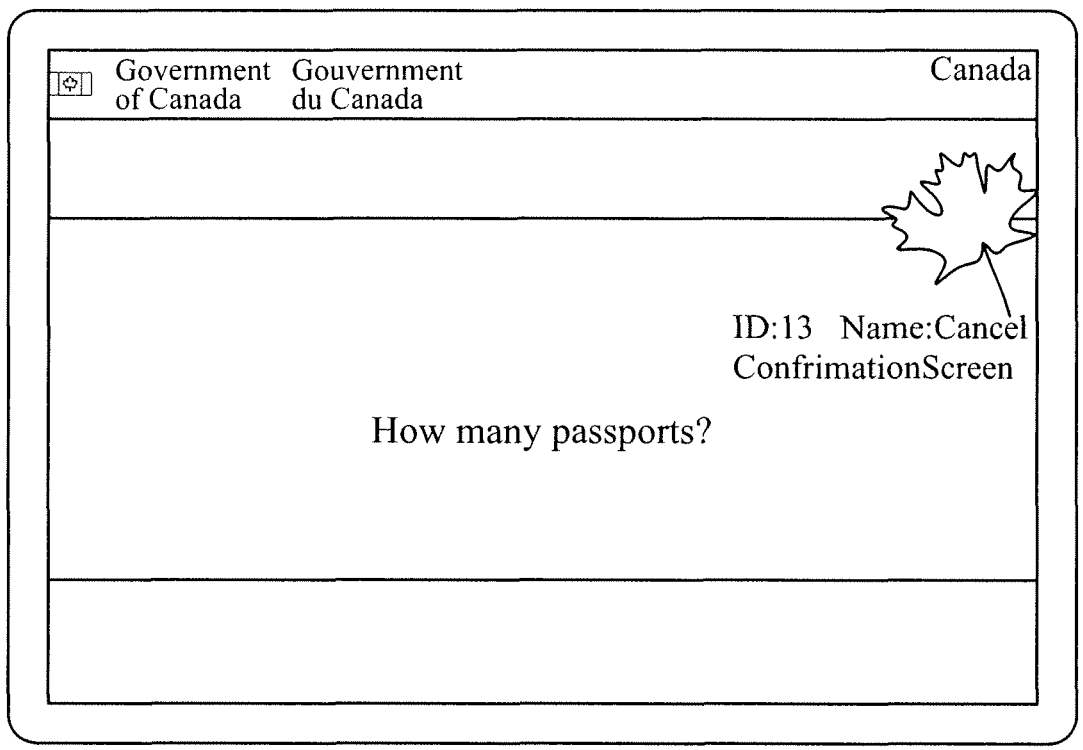
Figure 7D:
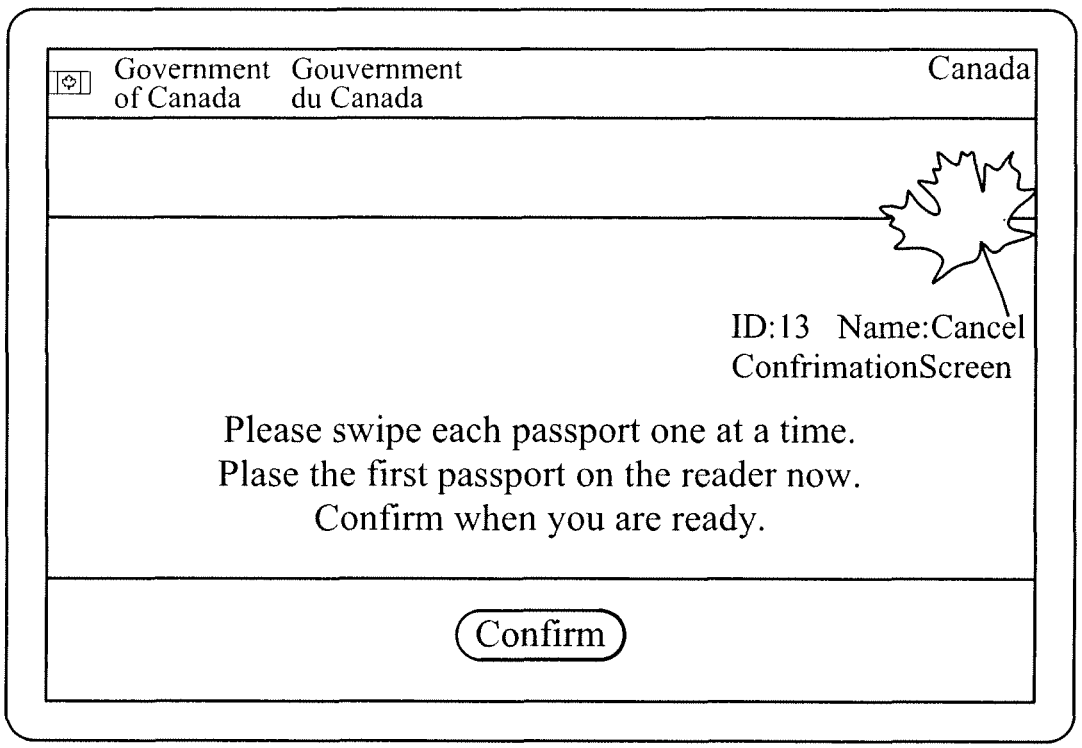
Figure 7E:
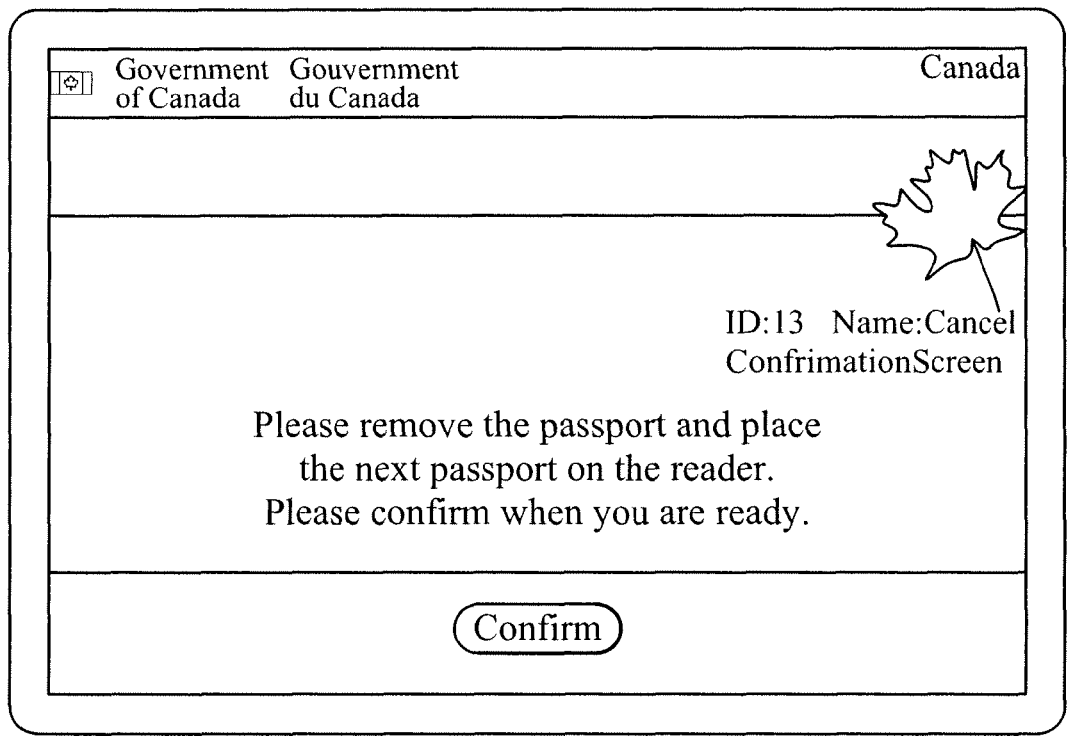
Figure 7F:
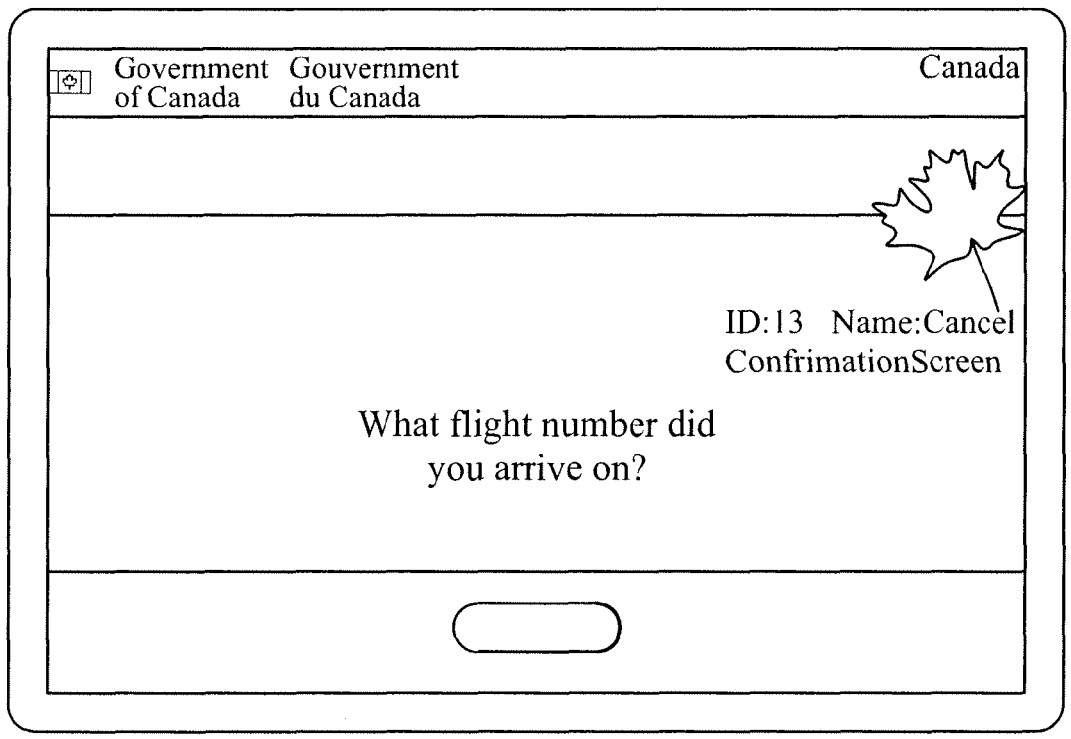
Figure 7G:
Figure 7H:
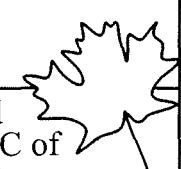
Figure 7I:
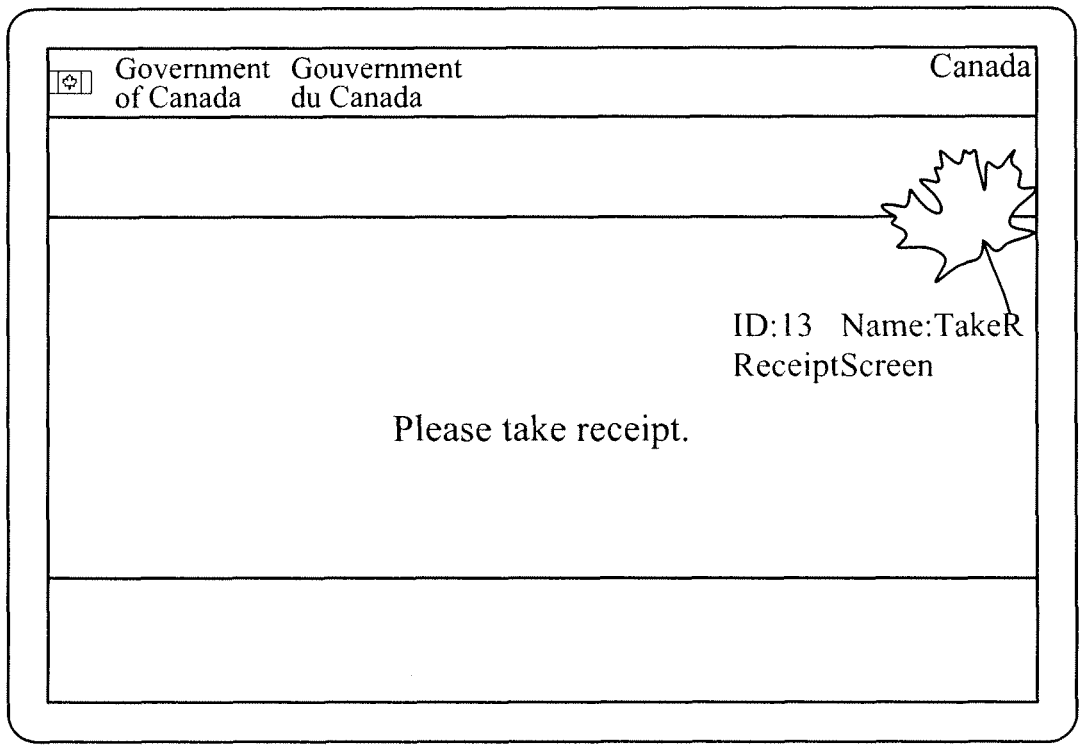
Figure 7J:
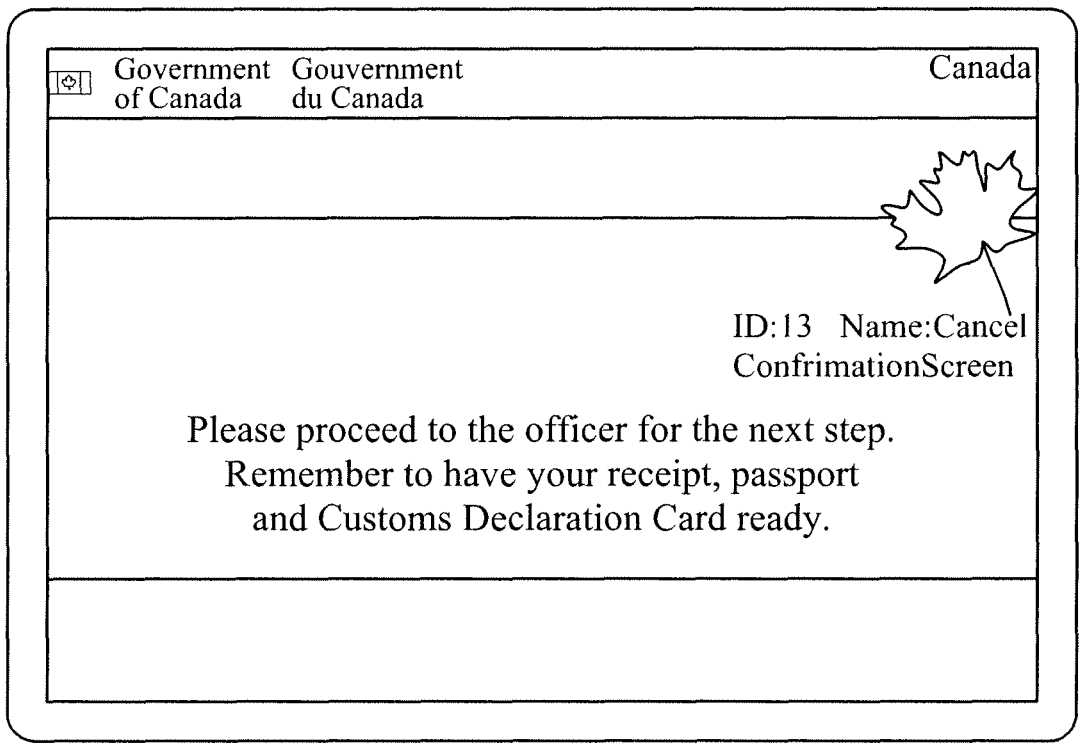

As seen in FIGS. 4 and 5 there are many ways of using kiosks 100. In a first embodiment, as seen in FIG. 4, travelers complete their declaration form prior to arriving at the kiosk (step 400). This may be conducted on the travel means, e.g. on the plane or ship, and before the traveler's arrival in the jurisdiction, or after arrival, but before reaching the kiosks.

When travelers arrive at kiosks 100, they are prompted to select a language (step 410). The available languages may be those most commonly spoken in the jurisdiction, or the official language(s) of the jurisdiction. In another embodiment, the languages available may be based on the probability of the travelers speaking that language based on the departure location of the airplane or ship. For example, if the airplane is arriving from Amsterdam, perhaps Dutch will be an available language, although it may otherwise be uncommon for the jurisdiction.

In step 420, the traveler is asked to insert their completed declaration form. Kiosk 100 attempts to read the form, and will later extract the necessary information using conventional means such as character recognition and the like. If the information cannot be obtained, the appropriate code may be printed to inform the customs agent that the declaration form was unreadable. Alternatively, the declaration form may be rejected by the kiosk and no code provided at all.

After obtaining the appropriate information from the declaration form, the kiosk 100 asks traveler 110 to insert their travel document, and if necessary open the travel document to the machine readable page (step 430). Kiosk 100 then scans the travel document. Kiosk 100 then obtains information from the declaration form and prompts the traveler for any additional information or clarification required (step 435). Kiosk 100 then sends the gathered information to server 101, which transmits the information to government computer 120 (step 440). Government computer 120 consults database 130, and transmits a code to kiosk 100 (step 450). Alternatively, government computer 120 transmits information to kiosk 100 which is used by kiosk 100 to generate the appropriate code.

Kiosk 100 can also determine the validity of a travel document, by checking certain aspects thereof. For example, if the travel document is a passport, kiosk 100 can determine validity by determining if the passport has expired, if it meets the correct formatting (e.g. the ICAO 9303 format); and if the MRZ check digits are correct (e.g. an altered document would have incorrect check digits). Other means for kiosk 100 to determine the validity of a passport include various forms of illumination, such as ultraviolet, infrared and laminate; tamper detection means, and other forms of active and passive identification, such as biometric information. The kiosk may provide the traveler feedback to inform them that their travel document has been successfully read.

The codes provided by the government computer, or calculated by the kiosk using information from the government computer, change regularly, for example daily, and are used to inform the customs agent if secondary processing is necessary for the traveler. Such secondary processing may be a random selection; it may be based on the identity of the traveler or a member of the traveler's family group; the residence of the traveler; or other criteria. The secondary processing may also be based on the completed declaration form, for example the traveler may need to pay duty on items brought into the jurisdiction. Alternatively, special circumstances may result in other government agencies, such as health agencies or security agencies, asking different questions to deal with potential problems such as mad cow disease or SARS.

Kiosk 100 then prints the code onto the declaration form (step 460) and ejects the declaration form with the code for the traveler. The traveler then takes declaration form (marked with the code) to the customs and/or immigration area and the declaration form is reviewed by a government agent, and the traveler is either released to the baggage carousel area or directed to secondary processing (step 470).

In an alternative embodiment, as shown in FIG. 5, rather than the traveler inserting the declaration form into kiosk 100, the traveler answers the questions on the form at the kiosk 100 (step 510). Once the code is obtained based on the information input and the travel document scanned, the code generated is provide to the traveler on a receipt printed by kiosk 100

(step 540) for signature by the traveler (or alternatively, the signature may be electronically entered by the traveler at the kiosk).

In yet another alternative embodiment, kiosk 100 may scan the declaration form, and request confirmation of all or some of the information on the card via the display and input means. In such an embodiment, each question answered on the form is shown to the traveler on the kiosk display with a confirmatory question, such as: "Please confirm you are not bringing firearms with you", or "Please confirm you are arriving on Flight No. X arriving from Departure Airport Y".

The Kiosk and the Customs Form

Kiosk 100 will either be able to read the declaration form or will put the appropriate questions to the travelers such as the number of travelers in the party. An example of a declaration form, currently known as the E311 card is shown in FIG. 6, and is used by the Canadian customs agency. Other jurisdictions use similar declaration forms with questions appropriate for their jurisdiction.

For example, the kiosk 100 can determine whether the traveler is a visitor to, or resident of, a jurisdiction, using the determination shown in Table 1:

TABLE 1

Algorithm for determining residency status from E311 card markings

| Presence of Marking | | Conclusion: The |
| --- | --- | --- |
| Part B Visitors to Jurisdiction | Part C Residents of Jurisdiction | individual is declaring that he/she is a: |
| ✓ | blank | Visitor to Jurisdiction |
| blank | ✓ | Resident of Jurisdiction |
| ✓ | ✓ | Clarification required |
| blank | blank | Clarification required |

If the declaration form is read, and kiosk 100 cannot determine the responses, clarification may be requested using the display and input means. The traveler will then have to answer each appropriate question to complete the kiosk process.

The kiosk 100 may be able to compare the "number of travelers" information entered on the declaration form to the number of people in the travel party identified by the traveler via kiosk 100.

The traveler may change an individual response within the process or cancel the entire process. A traveler may cancel the process prior to the message being sent to government computer and the print of the received code.

The kiosk 100 may display a message, and optionally animation, instructing the traveler to retrieve their declaration form and travel documents to present to a customs officer after the kiosk process is complete. This message can also be displayed if the process cannot be completed by the system.

The kiosk 100 may emit a warning sound, e.g. a 'continuous intermittent beep', after the transaction is completed to advise the traveler to take their travel document and customs form from kiosk 100.

If the message transmittal and response from the government computer times out, then kiosk 100 may prompt the traveler(s) to proceed to a government agent. Such a failure will be considered as an "unsuccessful" passage attempt, be logged for statistical reporting, and any traveler specific data will be deleted from kiosk 100. Similar failures may include the inability of kiosk 100 to read a travel document or a declaration form, inconsistent information between the declaration form and the answers provided to kiosk 100, or the inability of kiosk 100 to provide a code for the traveler (for example due to a communications failure).

The information contained in the travel document is transmitted to the government computer 120 for risk assessment by the customs and/or immigration agency, and need not be stored locally.

Kiosk 100 may determine that a traveler declaration value entered on the declaration form or at the kiosk 100 is greater than the legal exemption limit for a specified absence period, plus a threshold value as determined by the customs agency. Examples include the value of goods, or of alcohol or cigarettes, which may exceed such a predetermined legal exemption limit and the threshold value. The threshold value may vary by time period or for the type of good, and may be transmitted to kiosk 100 via government computer 120.

Coding

Travelers, who are granted passage at the kiosk, may be issued a receipt, which may be a coded declaration form identifying the traveler's name (as initially presented for travel document reading), date and referral/release codes and kiosk ID.

The kiosk 100 should be able to record and print the following for each traveler transaction: the customs code (the customs referral code or release code); the customs work location identity; the traveler(s)' name(s); an optional further code for secondary processing (e.g. agriculture, secondary or cash); and the transaction date.

The customs code typically has two components: a referral code required for customs and immigration, and a customs form code based on the contents of the completed declaration form to indicate different referral types based on the declaration form information. The declaration form code may be kiosk 100 generated, or generated by server 101.

At the conclusion of each kiosk transaction, the kiosk 100 may send a message to the government computer 120 via server 101 including the specific names of the travelers and the referral coding applicable to each. The kiosk display 320 may advise the traveler that the process is complete and instruct the user to proceed via an error message such as "Passage process complete. Please retrieve your travel documents and proceed to the next checkpoint beyond the kiosk."

If kiosk 100 fails to complete the transaction, no code is provided, and the display 320 will show an error message such as "Cannot complete process, retrieve your travel documents and proceed to a regular Primary Inspection Lane."

Travel document reader 310 may also be able to read and validate electronic passports, such as E-Passports or specialized travel documents requiring pre-registration, such as the NEXUS card.

Kiosk User Interface

Kiosk 100 will have a number of user screens to allow the traveler to provide or confirm information, and to instruct the traveler as to the next action. The majority of travelers will respond to these screens without having to enter answers for alternative screens. Typical screens, as shown in FIGS. 7A through 7J, include a Welcome/Language selection screen; a Number of Travelers screen; a number of Passports screen; Swipe Passport(s) screen; a Remove Passport screen; a Flight Number Screen; a Customs Form Confirmation screen; an Exemption screen; a Retrieve Receipt screen; and a Proceed to Officer screen.

Additional displays may relate to dealing with aborted transactions; for example: an Invalid Passport or Permanent Resident card; Document Inserted Incorrectly; Document Reader Device Fails; User Cancels Kiosk Process or Inactivity Time-out; System failure; kiosk does not respond within allowable response time; Traveler attempts second passage following a successful passage; Travel Document Has Expired, Does Not Adhere to ICAO 9303, or Contains Incorrect MRZ Check Digits. Other screens may include: Retrieve Customs Form screen; and read Permanent Resident Card screen.

Under certain circumstances, other government related questions may be displayed by the kiosk for answer by travelers. Such questions may relate to national security or health issues and may be triggered by answers to previous questions (such as the location from which the traveler is arriving).

Certain displays screens will only be displayed if appropriate, for example if the traveler answers "yes" to questions relating to cash, firearms, value of goods (for determining duty), etc., they may be prompted for further information.

Aspects of the above described system and method can be implemented as a series of instructions stored on computer readable memory within a networked device, such as within RAM, or on computer readable storage medium. Such aspects may be expressed as a series of instructions present in a carrier wave embodying a computer data signal to communicate the instructions to a networked device or server, which when executed by a processor within the computer or server, carry out the method.

Although the particular preferred embodiments of the invention have been disclosed in detail for illustrative purposes, it will be recognized that variations or modifications of the disclosed apparatus lie within the scope of the present invention.

We claim:

1. A kiosk associated with a destination jurisdiction for processing a traveler, to enhance customs efficiency, comprising:
   (a) means for receiving, reading information from and assessing validity of a travel document associated with said traveler, said travel document providing at least traveler citizenship information;
   (b) a traveler declaration/question generating interface, which is capable of directing to and receiving from the traveler a plurality of information relating to at least one of the following: traveler names, traveler address(es), dates of travel, residency of traveler, length of trip, purpose of trip, value of goods being transported by traveler; type of goods being transported by traveler, and farm/agriculture connections of the traveler;
   (c) a processor configured to transmit information received from said travel document and from said traveler declaration/question generating interface to a government computer via a communications interface, said processor being configured to receive a customs code from said government computer at said communications interface in response to said information being successfully transmitted to said government computer, said customs code providing an indication to a customs agent downstream of the kiosk as to whether or not secondary processing of the traveler is required;
   (d) a printer, said printer preparing a receipt for said traveler, said receipt including said customs code;
   wherein said customs code includes two possible values, one of which is an indicator that secondary processing of the traveler is required and one of which is an indication that secondary processing of the traveler is not required;
   wherein it is not apparent to the traveler from the customs code whether secondary processing is required or not.

2. The kiosk of claim 1 wherein the traveler declaration/question generating interface receives textual or tactile inputs.

3. The kiosk of claim 1, wherein the apparatus is for location at a point of departure of the traveler, and wherein the government computer is associated with a jurisdiction to which said traveler is traveling.

4. The kiosk of claim 1, wherein the apparatus is for location at a destination country.

5. An apparatus associated with a destination jurisdiction for processing travelers into the jurisdiction, to enhance customs efficiency, the apparatus comprising:
   a reader for receiving and reading information from a travel document associated with said traveler, said travel document providing at least traveler citizenship information;
   a traveler interactive interface, which is capable of directing to and receiving from the traveler a plurality of information relating to at least one of the following: traveler names, traveler address(es), dates of travel, residency of traveler, length of trip, purpose of trip, value of goods being transported by traveler; type of goods being transported by traveler, and farm/agriculture connections of the traveler;
   a processor configured to:
     assess validity of said travel document associated with said traveler;
     transmit information received from said travel document and from said traveler interactive interface to a government computer via a communications interface, said processor being configured to receive a customs code from said government computer at said communications interface in response to said information being successfully transmitted to said government computer, said customs code providing an indication to a customs agent downstream of the kiosk as to whether secondary processing of the traveler is required; and
   a printer, said printer preparing a receipt for said traveler, said receipt including said customs code;
   wherein said customs code includes two possible values, one of which is an indicator that secondary processing of the traveler is required and one of which is an indication that secondary processing of the traveler is not required;
   wherein it is not apparent to the traveler from the customs code whether secondary processing is required or not.

6. The kiosk of claim 5 wherein the traveler interactive interface receives textual or tactile inputs.

7. The kiosk of claim 5, wherein the kiosk is for location at a point of departure of the traveler and wherein the government computer is associated with a jurisdiction to which said traveler is traveling.

8. The kiosk of claim 5, wherein the kiosk is for location at a destination country.

9. The kiosk of claim 8 wherein the customs code changes regularly.

10. The kiosk of claim 9 wherein said customs code comprises a bar code.

11. The kiosk of claim 5 wherein said customs code comprises at least two components including:
    a referral code component indicating whether secondary processing is required;
    a customs form code component based on the plurality of information received from the traveler, the customs form code indicative of a referral type associated with the required secondary processing.

12. The kiosk of claim 5 wherein said processor is configured to transmit said information received from said travel document and from said traveler interactive interface to said government computer over a secure communications network.

13. The kiosk of claim 12 wherein said processor comprises a memory for locally storing said information and wherein said processor is configured to delete said information from said memory following an unsuccessful passage attempt by the traveler.

14. The kiosk of claim 5 wherein said communications interface is configured to receive said customs code from said government computer via a secure communications network.

15. The kiosk of claim 5 wherein the processor is in communication with a local server configured to provide an interface between said government computer and said kiosk.

16. The kiosk of claim 5 wherein said reader comprises a scanner configured to scan a portion of said travel document.

17. The kiosk of claim 16 wherein said travel document reader is configured to assess validity of the travel document by reading at least one of:
- an expiry date associated with the travel document;
- formatting information associated with the travel document;
- a check digit included in a machine readable area of the travel document;
- a tamper detection associated with the travel document;
- an illumination sensitive area of the travel document; and
- information provided by an electronic passport feature associated with the travel document.

18. The kiosk of claim 5 wherein said reader comprises a biometric scanner for acquiring biometric information from the traveler.

19. The kiosk of claim 18 wherein said biometric scanner comprises one of:
- a retinal scanner;
- a fingerprint reader; and
- a camera.

20. The kiosk of claim 18 wherein said reader is configured to receive biometric information associated with said travel document for comparison with said biometric information acquired from the traveler.

21. The kiosk of claim 20 wherein said biometric information comprises at least one of:
- a photograph of the traveler;
- a retinal scan of the traveler's eye; and
- a fingerprint obtained from the traveler.

22. The kiosk of claim 18 further comprising a signature analyzer and wherein:
- the travel document includes a signature of the traveler and the travel document reader is configured to scan said signature;
- said traveler interactive interface is configured to receive a signature of the traveler; and
- the signature analyzer is configured to compare the scanned signature from the travel document with the received signature for assessing the validity of the travel document.

23. The kiosk of claim 5 wherein said receipt further includes an identification of at least one of:
- the traveler's name(s);
- a date and time associated with the processing of the traveler;
- a kiosk identifier;
- a kiosk location; and
- a secondary processing code.

24. The kiosk of claim 23 wherein the secondary processing code on the receipt comprises coded information.

25. The kiosk of claim 5 wherein said traveler interactive interface is configured to receive an electronically input signature of the traveler.

26. The kiosk of claim 25 wherein said printer is configured to print the traveler's signature on said receipt.

27. The kiosk of claim 5 wherein said traveler interactive interface comprises a display.

28. The kiosk of claim 27 wherein the display comprises a touch screen display.

29. The kiosk of claim 27 wherein said traveler interactive interface is configured to display at least one of:
- a welcome screen;
- a traveler language selection screen;
- a flight number screen associated with a flight on which the traveler arrived;
- a flight number confirmation screen confirming the flight number;
- a request for confirmation of information associated with a customs declaration made by the traveler;
- a plurality of questions associated with receiving a customs declaration from the traveler;
- a prompt indicating to the traveler that they should proceed to a subsequent checkpoint;
- a prompt indicating to the traveler that they should proceed to a government agent; and
- an inactivity time-out message associated with the processing of the traveler.

30. The kiosk of claim 5 wherein said traveler interactive interface is configured to:
- display a plurality of questions associated with a customs declaration made by the traveler; and
- receive and record traveler responses to each of said questions.

31. The kiosk of claim 30 wherein the processor is configured to determine whether at least one of said traveler responses is within legal limitations associated with the travel undertaken by the traveler.

32. The kiosk of claim 5 wherein processing said traveler comprises processing a representative member of a family group of travelers.

33. The kiosk of claim 32 wherein the receiver is configured for receiving, reading information from, and assessing validity of travel documents associated with each traveler in said family group of travelers.

34. The kiosk of claim 5 wherein the kiosk comprises a networked device.

35. A kiosk associated with a destination jurisdiction for processing a traveler, to enhance customs efficiency, comprising:
(a) means for receiving, reading information from and assessing validity of a travel document associated with said traveler, said travel document providing at least traveler citizenship information;
(b) a declaration form reading and reviewing portal;
(c) a traveler interactive interface, which is capable of directing questions to and receiving answers from the traveler; and
(d) a processor configured to transmit information received from said travel document and from said traveler interactive interface to a government computer via communication means, said processor being configured to receive a customs code from said government computer at said communication means in response to said information being successfully transmitted to said government computer, said customs code providing an indication to a customs agent downstream of the kiosk as to whether secondary processing of the traveler is required;

wherein said customs code includes two possible values, one of which is an indicator that secondary processing of the traveler is required and one of which is an indication that secondary processing of the traveler is not required; wherein it is not apparent to the traveler from the customs code whether secondary processing is required or not.

36. The kiosk of claim 35 wherein if said declaration form cannot be read by said kiosk, said traveler is prompted to provide information to said kiosk.

37. The kiosk of claim 35 further comprising a printer and wherein said customs code is printed by said printer for receipt by said traveler.

38. The kiosk of claim 35 further comprising a printer and wherein said customs code is printed by said printer on said declaration form.

39. The kiosk of claim 35 wherein the traveler interactive interface receives textual or tactile inputs.

40. A system associated with a destination jurisdiction for processing travelers into the jurisdiction, to enhance customs efficiency, comprising:
 (a) a kiosk, said kiosk having:
  (i) means for receiving, reading information from and assessing validity of a travel document associated with said traveler, said travel document providing at least traveler citizenship information;
  (ii) a declaration form reading and reviewing portal;
  (iii) a processor configured to transmit information received from said travel document and from said declaration form reading and reviewing portal via a communications interface to a government computer, said processor being configured to receive a customs code from said government computer at said communications interface in response to said information being successfully transmitted to said government computer, said customs code providing an indication to a customs agent downstream of the kiosk as to whether secondary processing of the traveler is required;
  (iv) a printer; and
 (b) a secondary processing area for receiving said traveler, if said traveler is indicated as requiring secondary processing;
 wherein said customs code includes two possible values, one of which is an indicator that secondary processing of the traveler is required and one of which is an indication that secondary processing of the traveler is not required; wherein it is not apparent to the traveler from the customs code whether secondary processing is required or not.

41. A method for processing a traveler, comprising the steps of:
 (a) by a kiosk, a plurality of questions to said traveler;
 (b) by said kiosk, a passport from said traveler;
 (c) transmitting, by said kiosk, information about said traveler to a computer and receiving, by said kiosk, a customs code back from said computer in response to said information about said traveler being successfully transmitted to said computer, said customs code providing an indication to a customs agent downstream of the kiosk as to whether secondary processing of the traveler is required; and
 (d) printing, by said kiosk, a receipt for said traveler, said receipt containing said customs code;
 wherein said customs code includes two possible values, one of which is an indicator that secondary processing of the traveler is required and one of which is an indication that secondary processing of the traveler is not required; wherein it is not apparent to the traveler from the customs code whether secondary processing is required or not.

42. The method of claim 41 further comprising:
 generating, by said kiosk, a second code based on answers to said questions, said second code printed on said receipt.

43. A method for processing a traveler, to enhance customs efficiency, comprising the steps of:
 (a) providing said traveler a declaration form, said declaration form including a plurality of questions answerable by said traveler;
 (b) a kiosk associated with a destination jurisdiction receiving and assessing the validity of a travel document from said traveler;
 (c) said kiosk posing questions to and receiving answers directly from said traveler;
 (d) said kiosk transmitting information about said traveler to a government computer for the purpose of receiving a customs code from said government computer in response to said information being successfully transmitted to said government computer, said customs code providing an indication to a customs agent downstream as to whether secondary processing of the traveler is required;
 (e) said kiosk receiving said customs code from said government computer; and
 (f) printing said customs code on said declaration form;
 wherein said customs code includes two possible values, one of which is an indicator that secondary processing of the traveler is required and one of which is an indication that secondary processing of the traveler is not required; wherein it is not apparent to the traveler from the customs code whether secondary processing is required or not.

44. The method of claim 43 wherein the processing of said traveler is at a point of departure of the traveler and wherein the government computer is associated with a jurisdiction to which said traveler is traveling.

45. The method of claim 43 wherein said traveler is processed at a destination country.

46. A kiosk associated with a destination jurisdiction for processing a traveler, comprising:
 (a) a first receiver for reading information from a travel document associated with said traveler;
 (b) a second receiver for reading information from a declaration form from said traveler;
 (c) a communicator for transmitting said information from said travel document and from said declaration form to a computer and receiving a customs code back from said computer in response to said information being successfully transmitted to said computer, said customs code providing an indication to a customs agent downstream of the kiosk as to whether secondary processing of the traveler is required; and
 (d) a printer for printing said customs code;
 wherein said customs code includes two possible values, one of which is an indicator that secondary processing of the traveler is required and one of which is an indication that secondary processing of the traveler is not required; wherein it is not apparent to the traveler from the customs code whether secondary processing is required or not.

47. A method for processing a traveler, to enhance customs efficiency, comprising the steps of a kiosk associated with a destination jurisdiction:
 (a) assessing the validity of a travel document associated with said traveler, said travel document providing at least traveler citizenship information;

(b) directing to and receiving from the traveler a plurality of information relating to at least one of the following: traveler names, traveler address(es), dates of travel, residency of traveler, length of trip, purpose of trip, value of goods being transported by traveler; type of goods being transported by traveler, and farm/agriculture connections of the traveler;

(c) transmitting acquired information about said traveler to a government computer for the purpose of receiving a customs code from said government computer in response to said acquired information being successfully transmitted to said government computer, said customs code providing an indication to a customs agent downstream of the kiosk as to whether secondary processing of the traveler is required;

(d) receiving said customs code from said government computer;

(e) printing and providing said code to the traveler;

wherein said customs code includes two possible values, one of which is an indicator that secondary processing of the traveler is required and one of which is an indication that secondary processing of the traveler is not required;

wherein it is not apparent to the traveler from the customs code whether secondary processing is required or not.

48. The method of claim 47 wherein the kiosk is located at a point of departure of the traveler and wherein the government computer is associated with a jurisdiction to which said traveler is traveling.

49. The method of claim 47 wherein the kiosk is located at a destination country.

50. A non-transitory computer readable medium encoded with codes for causing an apparatus comprising at least a processor and a printer to perform a method for processing travelers into a jurisdiction, to enhance customs efficiency, the method comprising:

receiving and reading information from a travel document associated with said traveler, said travel document providing at least traveler citizenship information;

directing to and receiving from the traveler a plurality of information relating to at least one of the following: traveler names, traveler address(es), dates of travel, residency of traveler, length of trip, purpose of trip, value of goods being transported by traveler, type of goods being transported by traveler, and farm/agriculture connections of the traveler;

assessing validity of said travel document associated with said traveler;

transmitting information received from said travel document and from said traveler interactive interface to a government computer via a communications interface, and receiving a customs code from said government computer at said communications interface in response to said information being successfully transmitted to said government computer, said customs code providing an indication to a customs agent downstream of the kiosk as to whether secondary processing of the traveler is required; and printing a receipt for said traveler, said receipt including said customs code;

wherein said customs code includes two possible values, one of which is an indicator that secondary processing of the traveler is required and one of which is an indication that secondary processing of the traveler is not required;

wherein it is not apparent to the traveler from the customs code whether secondary processing is required or not.

* * * * *